United States Patent
Ho et al.

(10) Patent No.: US 12,293,490 B2
(45) Date of Patent: May 6, 2025

(54) IMAGE PROCESSING DEVICE AND IMAGE PROCESSING METHOD USING THREE-DIMENSIONAL AND ARTIFICIAL INTELLIGENCE NOISE REDUCTION

(71) Applicant: SigmaStar Technology Ltd., Fuijan (CN)

(72) Inventors: Hsiu-Wei Ho, Zhubei (TW); Chien-Yuan Tseng, Zhubei (TW); Ho-Tai Tsai, Zhubei (TW)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 521 days.

(21) Appl. No.: 17/708,080

(22) Filed: Mar. 30, 2022

(65) Prior Publication Data
US 2023/0111546 A1    Apr. 13, 2023

(30) Foreign Application Priority Data
Oct. 13, 2021  (CN) .......................... 202111193079.0

(51) Int. Cl.
| | | |
|---|---|---|
| *G06T 5/70* | (2024.01) | |
| *G06N 20/00* | (2019.01) | |
| *G06T 5/20* | (2006.01) | |
| *G06T 5/50* | (2006.01) | |
| *G06T 7/223* | (2017.01) | |

(52) U.S. Cl.
CPC ............... *G06T 5/70* (2024.01); *G06N 20/00* (2019.01); *G06T 5/20* (2013.01); *G06T 5/50* (2013.01); *G06T 7/223* (2017.01); *G06T 2207/20081* (2013.01)

(58) Field of Classification Search
None
See application file for complete search history.

(56) References Cited

U.S. PATENT DOCUMENTS

| | | | |
|---|---|---|---|
| 9,454,805 B2* | 9/2016 | Choi ........................ G06T 7/20 |
| 10,964,000 B2* | 3/2021 | Oh ............................ G06T 1/20 |
| 11,522,566 B2* | 12/2022 | Pister ..................... H04W 4/023 |
| 11,526,726 B2* | 12/2022 | Chen ....................... G06N 3/126 |
| 2008/0284530 A1* | 11/2008 | Pellerano ................ H03L 7/099 |
| | | | 331/1 A |
| 2020/0027202 A1* | 1/2020 | Oh ............................ G06T 5/70 |
| 2021/0234562 A1* | 7/2021 | Pister ....................... H04B 1/04 |
| 2022/0004839 A1* | 1/2022 | Chen ....................... G06N 3/088 |
| 2023/0111546 A1* | 4/2023 | Ho ............................ G06T 5/70 |
| | | | 382/200 |

* cited by examiner

*Primary Examiner* — Tahmina N Ansari
(74) *Attorney, Agent, or Firm* — Edell, Shapiro & Finnan, LLC

(57) ABSTRACT

An image processing device includes a three-dimensional noise reduction (3D NR) circuit, an artificial intelligence noise reduction (AI NR) circuit, a weight determination circuit and an image blending circuit. The 3D NR circuit performs a 3D NR operation on input image data to generate first image data. The AI NR circuit performs an AI NR operation on the input image data to generate second image data. The weight determination circuit outputs a blending weight according to a motion index. The image blending circuit blends the first image data and the second image data according to the blending weight to generate output image data.

19 Claims, 6 Drawing Sheets

IMAGE PROCESSING DEVICE AND IMAGE PROCESSING METHOD USING THREE-DIMENSIONAL AND ARTIFICIAL INTELLIGENCE NOISE REDUCTION

This application claims the benefit of China application Serial No. CN202111193079.0, filed on Oct. 13, 2021, the subject matter of which is incorporated herein by reference.

BACKGROUND OF THE INVENTION

Field of the Invention

The present application relates to an image processing device, and more particularly, to an image processing device and method using three-dimensional noise reduction (3D NR) and artificial intelligence noise reduction (AI NR) techniques.

Description of the Related Art

Three-dimensional noise reduction (3D NR) techniques perform noise reduction on images by means of averaging in terms of timing. In general, 3D NR techniques perform superimposing on consecutive images to reduce noise. Thus, a good NR effect can be achieved for still areas in the images. However, since the NR approach above needs a certain convergence time, a NR outcome for motion areas in the images is hardly satisfactory. As a result, in practice, a greater level of distortion may be caused in images processed by 3D NR techniques for image areas with low brightness (usually containing more noise).

SUMMARY OF THE INVENTION

In some embodiments, an image processing device includes a three-dimensional noise reduction (3D NR) circuit, an artificial intelligence noise reduction (AI NR) circuit, a weight determination circuit and a first image blending circuit. The 3D NR circuit performs a 3D NR operation on input image data to generate first image data. The AI NR circuit performs an AI NR operation on the input image data to generate second image data. The weight determination circuit outputs a blending weight according to a motion index. The first image blending circuit blends the first image data and the second image data according to the blending weight to generate output image data.

In some embodiments, an image processing method includes: performing a 3D NR operation on input image data by a 3D NR circuit to generate first image data; performing an AI NR operation on the input image data by an AI NR circuit to generate second image data; generating a blending weight according to a motion index; and blending the first image data and the second image data according to the blending weight to generate output image data.

In some embodiments, an image processing device includes a temporal filter, a spatial filter, an AI NR circuit and an image blending circuit. The temporal filter performs temporal filtering according to a reference frame and a current frame in input image data to generate first data. The spatial filter performs spatial filtering according to the reference frame and the current frame to generate second data. The AI NR circuit performs an AI NR operation on the input image data to generate third data. The image blending circuit blends the first data, the second data and the third data to generate output image data.

Features, implementations and effects of the disclosure are described in detail in preferred embodiments with the accompanying drawings below.

DETAILED DESCRIPTION OF THE INVENTION

Figure 1:
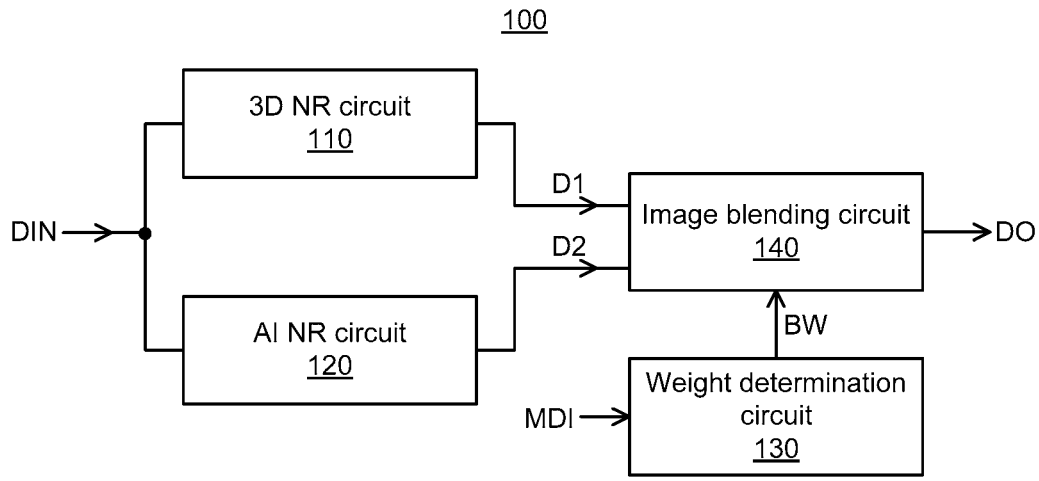
FIG. 1 is a schematic diagram of an image processing device according to some embodiments of the present application.

All terms used in the literature have commonly recognized meanings. Definitions of the terms in commonly used dictionaries and examples discussed in the disclosure of the present application are merely exemplary, and are not to be construed as limitations to the scope and meanings of the present invention. Similarly, the present invention is not limited to the embodiments enumerated in the description of the application.

The term "and/or" used in the literature includes any one or more combination of the related items enumerated. In the literature, terms such as first, second and third used are for describing and differentiating individual elements. Thus, a first element in the literature may also be referred to as a second element without departing from the intent of the present application. For better understanding, similar elements in the drawings are assigned with the same denotations.

FIG. 1 shows a schematic diagram of an image processing device 100 according to some embodiments of the present application. The image processing device 100 can perform noise reduction on input image data DIN to generate output image data DO. The image processing device 100 includes a three-dimensional noise reduction (3D NR) circuit 110, an artificial intelligence noise reduction (AI NR) circuit 120, a weight determination circuit 130 and an image blending circuit 140. The 3D NR circuit 110 performs a 3D NR operation on the input image data DIN to generate first image data D1. The AI NR circuit 120 performs an AI NR operation on the input image data DIN to generate second image data D2. The weight determination circuit 130 outputs a blending weight BW according to a motion index MDI. The motion index MDI indicates motion areas and still areas in a current frame in the input image data DIN. The image blending circuit 140 blends the first image data D1 and the second image data D2 according to the blending weight BW to generate the output image data DO.

In some embodiments, the 3D NR circuit 110 can perform temporal filtering and spatial filtering on the input image data DI to complete the NR processing on the input image data DIN. In some embodiments, the AI NR circuit 120 may learn by pre-training to perform NR processing on the input image data. In general, the 3D NR circuit 110 generates better NR effects on still areas in the input image data DIN. In contrast, the AI NR circuit 120 generates good NR effects for motion areas, but may consume more hardware resources in order to produce NR effects, for still areas, close to those achieved by the 3D NR circuit 110. That is to say, the AI NR circuit 120 needs a neural network having more layers and greater data processing capabilities in order to achieve NR effects, for still areas, close to those achieved by the 3D NR circuit 110. The present application combines respective advantages of the 3D NR circuit 110 and the AI NR circuit 120, identifies still areas and motion areas according to the motion index MDI, increases a ratio occupied in the blending weight BW by a weight corresponding the image data D1 output by the 3D NR circuit 110 and in contrast decreases a ratio occupied in the blending weight BW by a weight corresponding to the image data D2 output by the AI NR circuit 120 when processing the still areas, and increases the ratio occupied in the blending weight BW by the weight corresponding the image data D2 output by the AI NR circuit 120 and in contrast decreases the ratio occupied in the blending weight BW by the weight corresponding to the image data D1 output by the 3D NR circuit 110 when processing the motion areas. For example, when the motion index MDI indicates that a current area is a still area, the weight corresponding to the image data D1 in the blending weight BW is a first weight, and the weight corresponding to the image data D2 in the blending weight BW is a second weight. When the motion index MDI indicates that the current area is a motion area, the weight corresponding to the image data D1 in the blending weight BW is a third weight, and the weight corresponding to the image data D2 in the blending weight BW is a fourth weight, where the first weight is greater than the third weight, and the second weight is smaller than the fourth weight. Thus, the image blending circuit 140 can generate the output image data DO with better NR effects.

In some embodiments, as an amount of motion areas in the current frame of the input image data DIN increases, the ratio occupied in the blending weight BW by the weight corresponding to the image data D2 gets higher. Alternatively, as an amount of still areas in the current frame of the input image data DIN increases, the ratio occupied in the blending weight BW by the weight corresponding to the image data D1 gets higher. For example, when the motion index MDI indicates that the number of motion areas in the current frame is a first value, the weight corresponding to the image data D1 in the blending weight BW is a first weight, and the weight corresponding to the image data D2 in the blending weight BW is a second weight; when the motion index MDI indicates that the number of motion areas in the current frame is a second value, the weight corresponding to the image data D1 in the blending weight BW is a third weight, and the weight corresponding to the image data D2 in the blending weight BW is a fourth weight, wherein the first value is smaller than the second value, the first weight is greater than the third weight, and the second weight is smaller than the fourth weight. The foregoing embodiment may be simplified as using the motion index MDI to indicate whether the current frame is a still frame. More specifically, if the number of motion areas in the current frame is smaller than a threshold, the motion index MDI indicates that the current frame is a still frame, the weight corresponding to the image data D1 in the blending weight BW is a first weight, and the weight corresponding to the image data D2 in the blending weight BW is a second weight; if the number of motion areas in the current frame is greater than a threshold, the motion index MDI indicates that the current frame is a motion frame, the weight corresponding to the image data D1 in the blending weight BW is a third weight, the weight corresponding to the image data D2 in the blending weight BW is a fourth weight, wherein the first weight is greater than the third weight, and the second weight is smaller than the fourth weight. Thus, the image blending circuit 140 can generate the output image data DO with better NR effects.

Figure 2A:
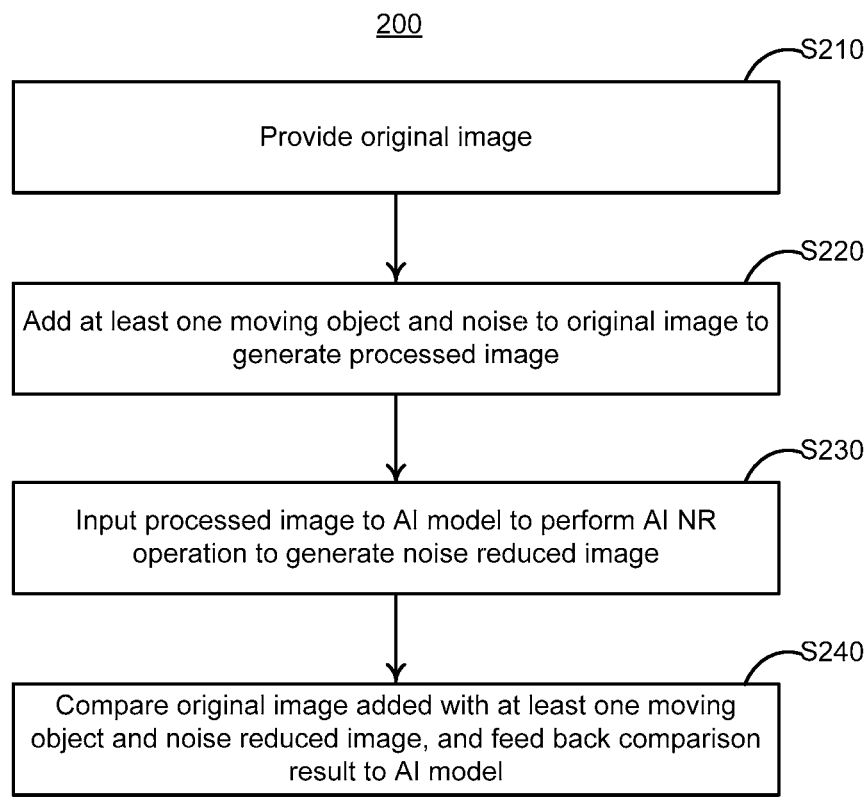
FIG. 2A is a flowchart of a method for training an artificial intelligence noise reduction (AI NR) circuit in FIG. 1 to learn an AI NR operation according to some embodiments of the present application.

FIG. 2A shows a flowchart of a method 200 for training the AI NR circuit 120 in FIG. 1 to learn an AI NR operation according to some embodiments of the present application. In operation S210, an original image is provided. In operation S220, at least one moving object and noise are added to the original image to generate a processed image. For example, the original image is a clear image. To generate a moving object, a partial image of the original image may be randomly captured to generate an object, and the object is randomly rotated or moved to generate a simulated image with a continual movement, and a movement distance of the object between two consecutive simulated images is limited within a predetermined range. With the configuration above, a simulated image containing a motion area (equivalent to a block where the object is located) can be generated. Next, noise may be added to the simulated image to generate the processed image. In some embodiments, noise may be added to the image with a moving object based on a noise mathematical model. For example, the noise mathematical model may be, for example but not limited to, a Gauss-Poisson model.

In operation S230, the processed image is input to an artificial intelligence (AI) model to perform an AR NR operation to generate a noise reduced image. In some embodiments, the AI model used by the AI NR circuit 120 may be, for example but not limited to, a gated recurrent circuit, and may perform a predetermined filtering operation on the processed image to generate the noise reduced image. In operation S240, the original image added with at least one moving object (that is, the simulated image) is compared with the noise reduced image, and a comparison result is fed back to the AI model. For example, the noise reduced image and the simulated image are compared for distortions or differences between the two, and information of the distortions or differences is fed back to the AI model. The steps above are repeated, so that the AI model can be trained to output a noise reduced image that converges to the simulated image (that is, the original image added with the moving object). Thus, the AI NR circuit 120 can learn to reduce noise of images to generate a noise reduced image with less distortion.

Figure 2B:
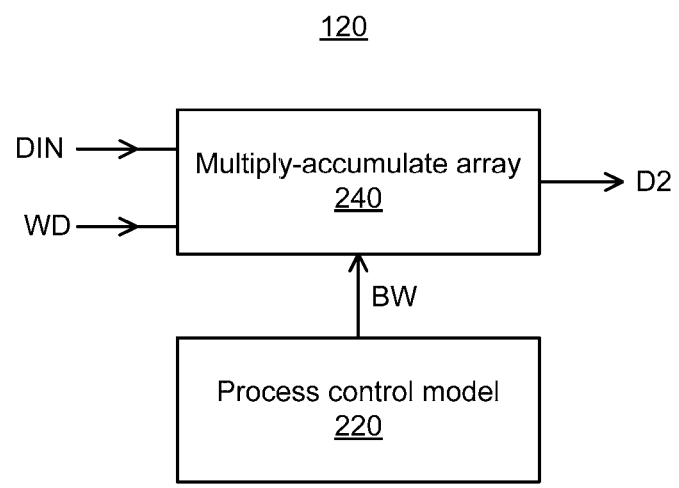
FIG. 2B is a schematic diagram of an AI NR circuit in FIG. 1 according to some embodiments of the present application.

FIG. 2B shows a schematic diagram of the AI NR circuit 120 in FIG. 1 according to some embodiments of the present application. In some embodiments, the AI NR circuit 120 includes a process control module 220 and a multiply-accumulate array 240. The process control module 220 controls the multiply-accumulated array 240 to perform the AI NR operation above. The multiply-accumulate array 240 may read weight data WD (which may be obtained from training with the method 200 in FIG. 2A) associated with the AI model from a memory (not shown) of the system based on control of the process control module 220, and perform a calculation (that is, the AI NR operation) on the input data DIN according to the weight data WD to generate the image data D2. In some embodiments, the process control module 220 may be implemented by a digital signal processing circuit and/or software, and the multiply-accumulate array 240 may be implemented by multiple logic circuits, operational circuits and/or buffer circuits.

It should be noted that the details of training and implementation above for the AI NR circuit 120 are examples, and are not to be construed as limitation to the present application. Various types of AI models and/or various types of hardware architecture of neural networks capable of achieving AI are to be encompassed within the scope of the present application.

Figure 3A:
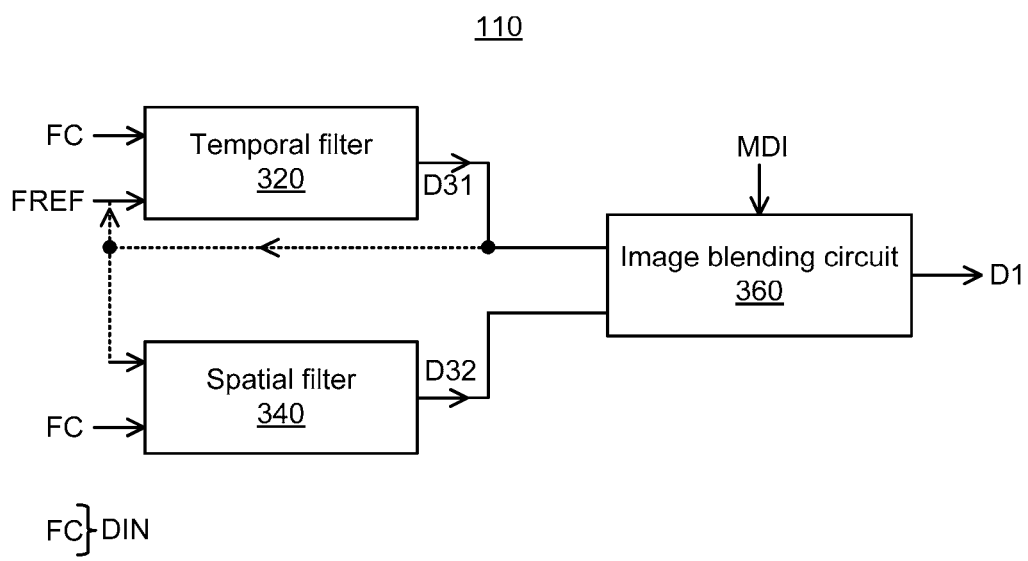
FIG. 3A is a schematic diagram of a three-dimensional noise reduction (3D NR) circuit in FIG. 1 according to some embodiments of the present application.

FIG. 3A shows a schematic diagram of the 3D NR circuit 110 in FIG. 1 according to some embodiments of the present application. In this example, the 3D NR circuit 110 includes a temporal filter 320, a spatial filter 340 and an image blending circuit 360. The temporal filter 320 performs temporal filtering according to a current frame FC and a reference frame FREF in the input image data DIN to generate data D31. In this example, the data D31 may be output as the reference frame FREF to be used by the temporal filter 320 for processing a next frame. Alternatively, in some other embodiments, the reference frame FREF may be a previous frame of the current frame FC in the input image data DIN. In some embodiments, the temporal filter 320 may be implemented by an infinite pulse response filter. With the temporal filtering operation, the temporal filter 320 may superimpose images of consecutive frames (for example, superimposing the current frame FC and the reference frame FREF), so as to implement a noise filtering process on images.

The spatial filter 340 performs spatial filtering according to the current frame FC and the reference frame FREF in the input image data DIN to generate data D32. For example, the spatial filter 340 may adjust (for example, operations such as smoothing filtering, intermediate value filtering and object edge reinforcement) multiple pixel values in the current frame FC using a mask to generate the data D32. The image blending circuit 360 blends the data D31 and the data D32 according to the motion index MDI to generate the image data D1. The image blending circuit 360 may set a blending ratio of the data D31 and the data D32 according to the motion index MDI. For example, since the temporal filtering operation performs noise reduction by superimposing images, the temporal filter 320 has better NR effects for still areas in the image. Thus, for still areas in the current frame FC, the image blending circuit 360 may use the data D31 having a higher weight for blending. Alternatively, for motion areas in the current frame FC, the image blending circuit 360 may use the data D32 having a higher weight for blending.

Figure 3B:
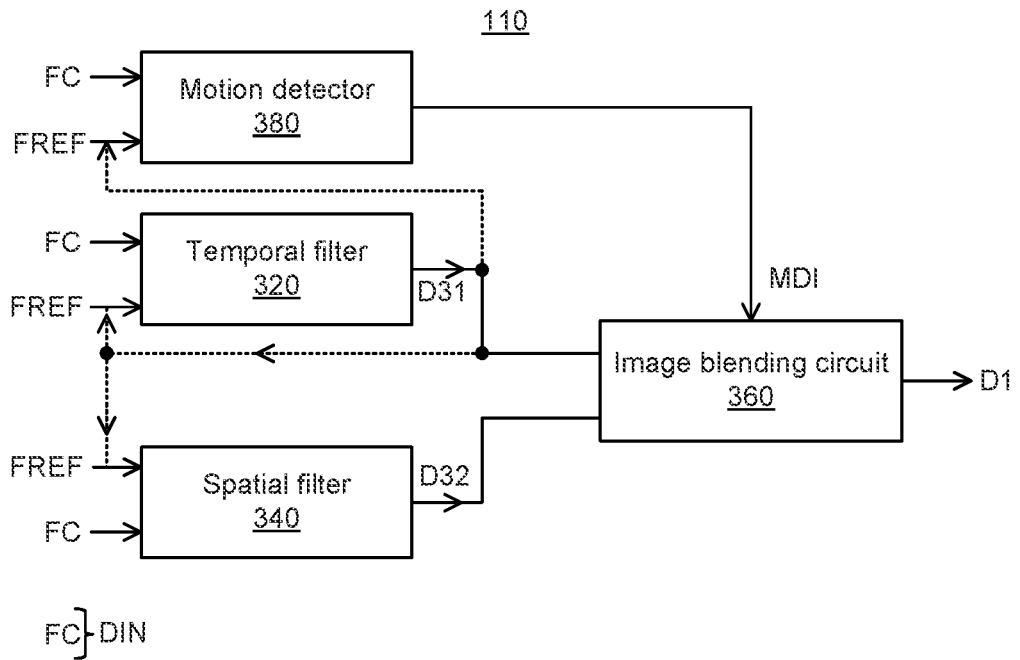
FIG. 3B is a schematic diagram of a 3D NR circuit in FIG. 1 according to some embodiments of the present application.

FIG. 3B shows a schematic diagram of the 3D NR circuit 110 in FIG. 1 according to some embodiments of the present application. Compared to FIG. 3A, the 3D NR circuit 110 of this example further includes a motion detector 380. The motion detector 380 may detect motion area information of the current frame FC according to a difference between the current frame FC and the reference frame FREF to generate the motion index MDI. Specific configuration details of the motion detector 380 are to be described shortly with reference to FIG. 4. In this example, the motion index MDI generated by the motion detector 380 may be provided to the weight determination circuit 130 in FIG. 1 so as to determine the blending weight BW. In one embodiment, the motion index MDI generated by the motion detector 380 is provided to the AI NR circuit 120, and the AI NR circuit 120 may identify still areas and motion areas according to the motion index MDI so as to adaptively adjust the NR operation performed on the input image data DIN to improve the NR effects.

Figure 3C:
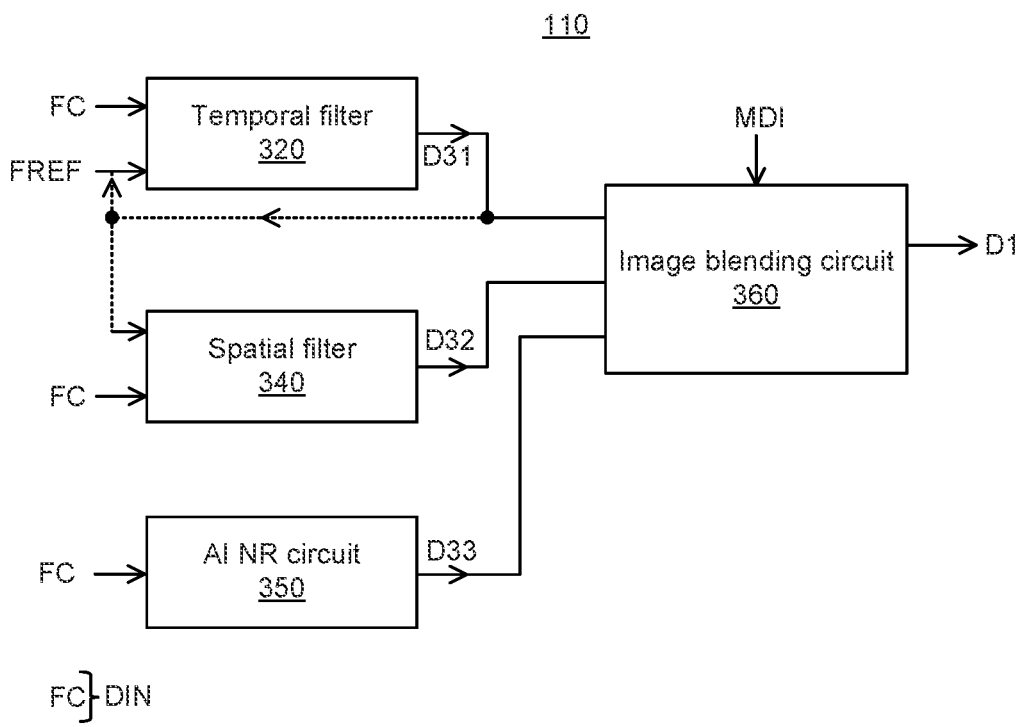
FIG. 3C is a schematic diagram of a 3D NR circuit in FIG. 1 according to some embodiments of the present application.

FIG. 3C shows a schematic diagram of the 3D NR circuit 110 in FIG. 1 according to some embodiments of the present application. Compared to FIG. 3A, the 3D NR circuit 110 of this example further includes an AI NR circuit 350. The AI NR circuit 350 performs an AI NR operation on the current frame FC to generate data D33. The image blending circuit 360 blends the data D31, the data D32 and the data D33 to generate the image data D1. In practice, the image blending circuit 360 may set a blending ratio of the data D31, the data D32 and the data D33 according to the motion index MDI, noise conditions of the current frame FC and/or user setting values. In this example, the NR effects of the 3D NR circuit 110 are enhanced by means of blending the noise reduced image output by the AI NR circuit 350, and more particularly, NR effects for motion areas in high noise conditions can be enhanced. In one embodiment, the 3D NR circuit 110 may further include a switch (not shown) arranged between the AI NR circuit 350 and the image blending circuit 360, and a user may control this switch according to different application scenarios or requirements, so as to determine whether to output the data D33 to the image blending circuit 360.

Figure 4:
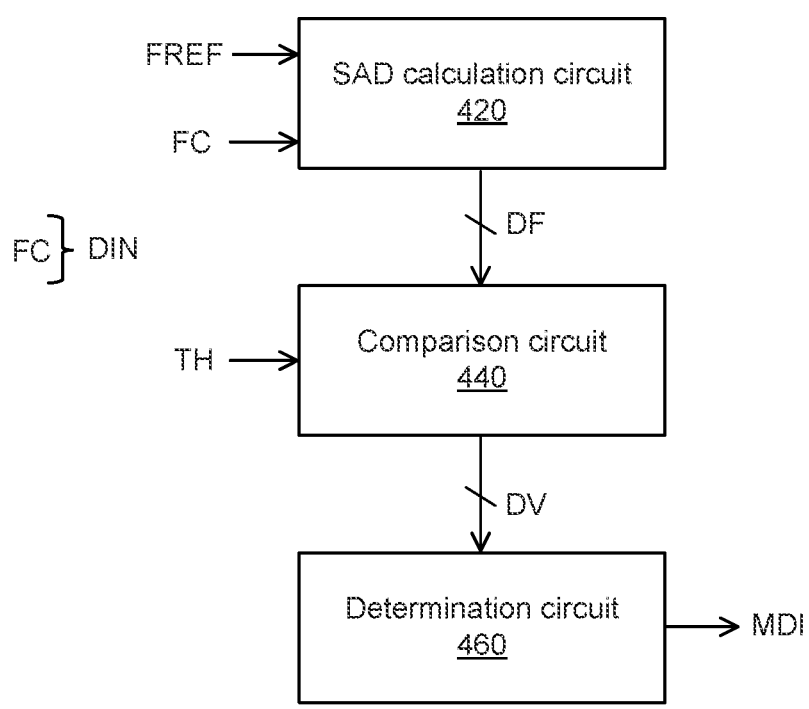
FIG. 4 is a schematic diagram of a motion detector in FIG. 3B according to some embodiments of the present application.

FIG. 4 shows a schematic diagram of the motion detector 380 in FIG. 3B according to some embodiments of the present application. The motion detector 380 includes a sum of absolute differences (SAD) calculation circuit 420, a comparison circuit 440 and a determination circuit 460. The SAD circuit 420 calculates absolute differences between a plurality of pixel values of a corresponding block in the current frame FC and the reference frame FREF to generate a plurality of differences DF. For example, the SAD calculation circuit 420 may calculate an absolute difference between a pixel value of each pixel in the data block of the current frame FC and the pixel value of each pixel in the corresponding data block of the reference frame FREF, and add up the absolute differences to determine the difference DF corresponding to the data block. As the difference DF gets smaller, images of the data block presented in the current frame FC and the reference frame FREF have a higher level of similarity, meaning that the data block is better characterized as a still area. As the difference DF gets larger, images of the data block presented in the current frame FC and the reference frame FREF have a lower level of similarity, meaning that the data block is better characterized as a motion area.

The comparison circuit 440 compares each of these differences DF with a threshold value TH to generate a plurality of detection values DV. For example, if the difference DF corresponding to a first block is greater than the threshold value TH, the comparison circuit 420 may output a corresponding detection value DV having a first logic value to indicate that the first block is a motion area. If the difference DF corresponding to a second block is not greater than the threshold value TH, the comparison circuit 440 may output a corresponding detection value DV having a second logic value to indicate that the first block is a still area. As such, the determination circuit 460 may determine motion area information of a plurality of corresponding blocks in the current frame FC according to the plurality of detection values DV so as to determine the motion index MDI. In some embodiments, the motion index MDI may used to indicate that the corresponding block in the current frame FC is a motion area.

In some embodiments, each of the SAD calculation circuit 420, the comparison circuit 440 and the determination circuit 460 may be implemented by one or more logical circuits or digital signal processing circuits, or may be integrated as one operation processing circuit. It should be noted that the configuration details of the motion detector 380 above are examples, and are not to be construed as limitation to the present application.

Figure 5:
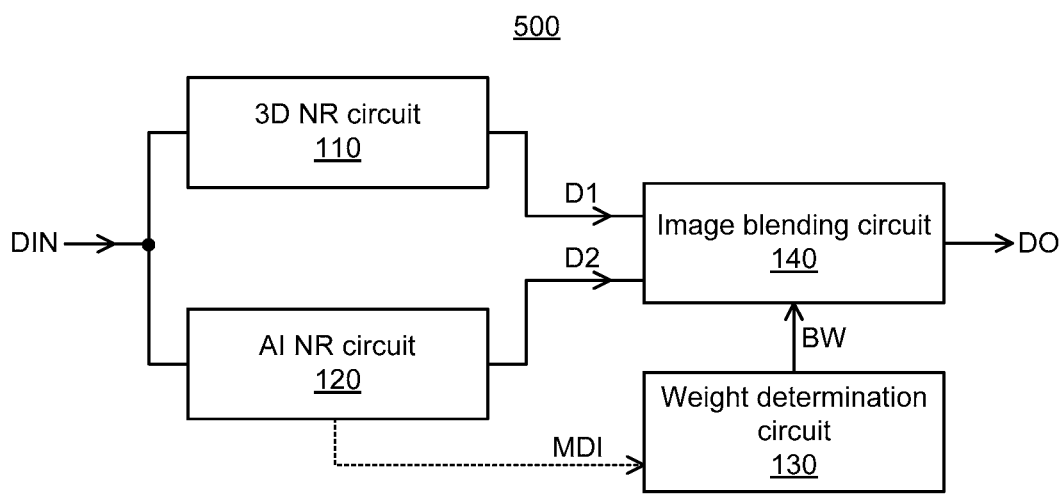
FIG. 5 is a schematic diagram of an image processing device according to some embodiments of the present application.

FIG. 5 shows a schematic diagram of an image processing device 500 according to some embodiments of the present application. Compared to the embodiment in FIG. 1 or FIG. 3A, the AI NR circuit 350 may be further used to output the motion index MDI. For example, the operation of the motion detector 380 in FIG. 3B may be implemented by the AI NR circuit 120 instead. Specifically, the AI model used by the AI NR circuit 120 may further learn how to determine motion areas in an image during the training process in FIG. 2A, so as to determine the motion index MDI according to the input image data DIN. For example, during the training process, the AI model may learn motion areas in an image based on a processed image and an original image (for example, determining the position of at least one moving object in the image), so as to generate the motion index MDI. In some embodiments, the AI NR circuit 120 can determine the motion index MDI according to the current frame FC and the data D31 from the temporal filter 320 in FIG. 3A.

In other words, in different embodiments, the motion index MDI can be generated by the motion detector 380 (as shown in FIG. 3B) in the 3D NR circuit 110 or be generated by an AI circuit (as shown in FIG. 5). It should be noted that the details for generating the motion index MDI are examples, and are not to be construed as limitation to the present application. In other embodiments, the operation for generating the motion index MDI above may be implemented by an independent AI circuit (that is, not limited to being the AI NR circuit 120 in FIG. 1).

In one embodiment, the motion index MDI generated by the AI NR circuit 120 may be provided to the 3D NR circuit 110, and the 3D NR circuit 110 may then accordingly perform an NR operation. For example, the temporal filter 320 in the 3D NR circuit 110 may adjust the temporal filtering performed on the current frame FC and the reference frame FREF according to the motion index MDI. The spatial filter 340 in the 3D NR circuit 110 may also adjust the spatial filtering performed on the current frame FC and the reference frame FREF according to the motion index MDI.

Figure 6:
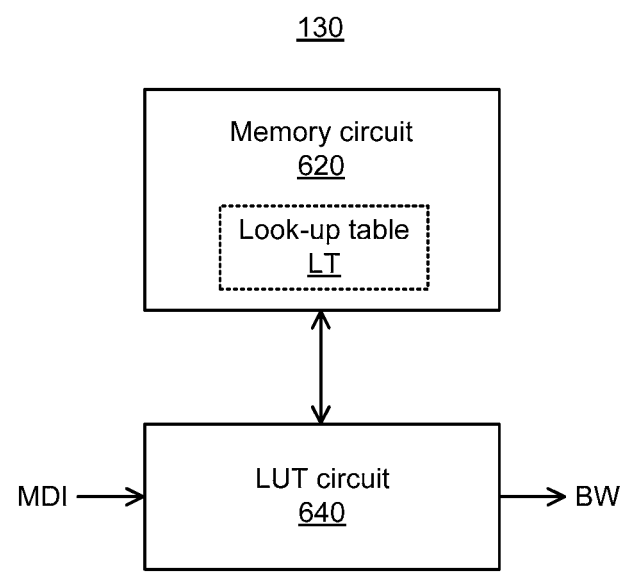
FIG. 6 is a schematic diagram of a weight determination circuit in FIG. 1 according to some embodiments of the present application.

FIG. 6 shows a schematic diagram of the weight determination circuit 130 in FIG. 1 according to some embodiments of the present application. The weight determination circuit 130 includes a memory circuit 620 and a look-up table (LUT) circuit 640. The memory circuit 620 stores a look-up table LT, which records the correspondence between the motion index MDI and a plurality of sets of blending weights. The LUT circuit 640 reads the look-up table LT according to the motion index MDI, and outputs the corresponding blending weight BW according to the motion index MDI. It should be noted that the configuration details of the weight determination circuit 130 above are examples, and are not to be construed as limitation to the present application.

Figure 7:
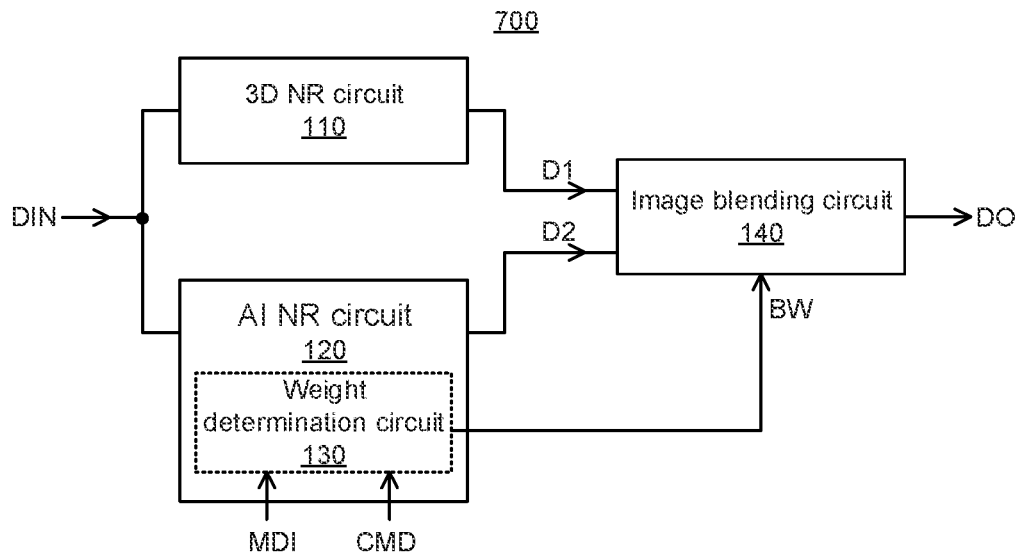
FIG. 7 is a schematic diagram of an image processing device according to some embodiments of the present application.

FIG. 7 shows a schematic diagram of an image processing device 700 according to some embodiments of the present application. In some embodiments, the weight determination circuit 130 may be implemented by an AI circuit. As shown in FIG. 7, compared to the embodiment in FIG. 1, the operation of the weight determination circuit 130 may be performed by the AI NR circuit 120. In other words, the AI circuit implementing the weight determination circuit 130 may be a partial circuit of the AI NR circuit 120.

More specifically, the AI model used by the AI NR circuit 120 may further learn to blend the data D2 (which provides better NR effects for motion areas in an image) and the data D31 (which provides better NR effects for still areas in an image) from the temporal filter 320 in FIG. 3 according to the motion index MDI in the training process in FIG. 2A, so as to learn to generate the blending weight BW that is appropriate. For example, the AI model may determine whether the blending weight BW used by the current blended images is appropriate based on the difference between the blended image and the original image, and learn an appropriate generation method by means of repeated training.

It should be noted that the implementation details of the weight determination circuit 130 above are examples, and are not to be construed as limitation to the present application. In other embodiments, the operation of the weight determination circuit 130 may also be performed by an independent AI circuit (that is, not limited to being the AI NR circuit 120 in FIG. 1).

In practice, the blending weight BW determined by the AI circuit does not always satisfy requirements of all users. To improve such issue, in this example, the weight determination circuit 130 may adjust the blending weight BW according to an external command CMD. For example, if the user wishes to generate the output image data DO by using a higher ratio of the image data D2 (or the image data D1), the user may change the ratio occupied in the blending weight BW by the image data D2 (or the image data D1) by means of inputting the external command CMD. The weight determination circuit 130 may adjust the selected blending weight BW based on the motion index MDI according to the external command CMD. Thus, the image blending circuit 140 can correspondingly adjust the output image data DO. With the configuration means above, the user is provided with an additional approach for adjusting an image of the output image data DO into an image that satisfies user requirements.

It should be understood that, the configuration details for adjusting the blending weight BW according to the external command CMD are not limited to the embodiment in FIG. 7. In one or more previous embodiments, the image processing device 100 (or the image processing device 500) may also be added with the configuration details for adjusting the blending weight BW according to the external command CMD (or directly adjusting the output image data DO), so as to provide higher utilization flexibilities for the user to adjust an image.

Figure 8:
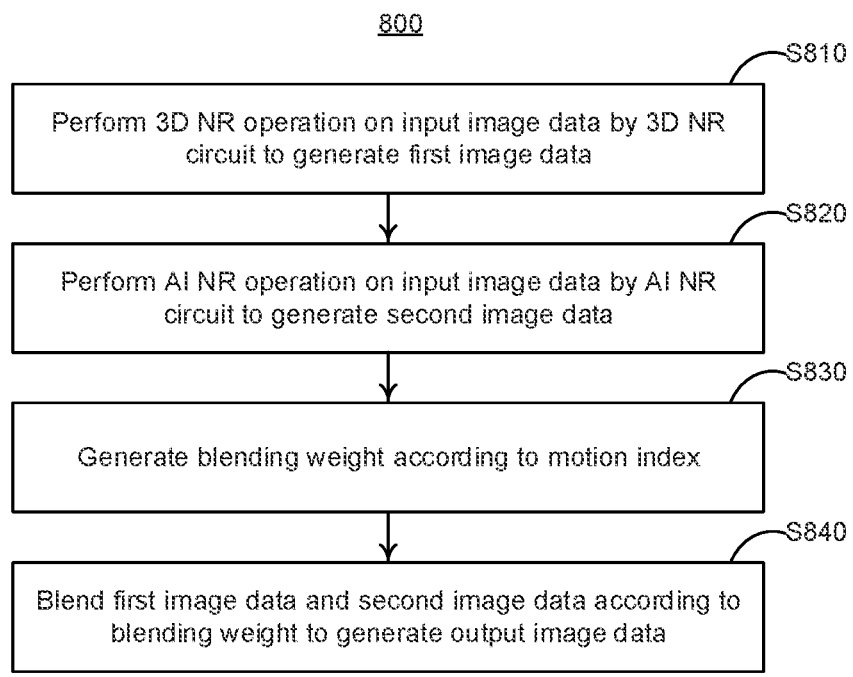
FIG. 8 is a flowchart of an image processing method according to some embodiments of the present application.

FIG. 8 shows a flowchart of an image processing method 800 according to some embodiments of the present application. In some embodiments, the image processing method 800 may be performed by, for example but not limited to, the image processing device 100, 500 or 700.

In operation S810, a 3D NR operation is performed on input image data by a 3D NR circuit to generate first image data. In operation S820, an AI NR operation is performed on the input image data by an AI NR circuit to generate second image data. In operation S830, a blending weight is generated according to a motion index. In operation S840, the first image data and the second image data are blended according to the blending weight to generate output image data.

The details of the plurality of operations above may be referred from the description associated with the foregoing embodiments, and are omitted herein for brevity. The plurality operations of the image processing method 800 above are merely examples, and are not limited to being performed in the order specified in this example. Without departing from the operation means and ranges of the various embodiments of the present application, additions, replacements, substitutions or omissions may be made to the operations of the image processing method 800, or the operations may be performed in different orders (for example, simultaneously performed or partially simultaneously performed).

In conclusion, the image processing device and method of some embodiments of the present application can provide image data having better NR effects for still areas by means of 3D NR techniques and provide image data having better NR effects for motion areas by means of AI techniques, and blend both of the image data above based on a motion index in the images to generate more clear output image data.

While the present application has been described by way of example and in terms of the preferred embodiments, it is to be understood that the present application is not limited thereto. Various modifications made be made to the technical features of the present application by a person skilled in the art on the basis of the explicit or implicitly disclosures of the present application. The scope of the appended claims of the present application therefore should be accorded with the broadest interpretation so as to encompass all such modifications.

What is claimed is:

1. An image processing device, comprising:
    a three-dimensional noise reduction (3D NR) circuit, performing a 3D NR operation on input image data to generate first image data;
    an artificial intelligence noise reduction (AI NR) circuit, performing an AI NR operation on the input image data to generate second image data;
    a weight determination circuit, outputting a blending weight according to a motion index; and
    a first image blending circuit, blending the first image data and the second image data according to the blending weight to generate output image data.

2. The image processing device of claim 1, wherein when the motion index indicates that a current area in the input image data is a still area, a weight corresponding to the first image data in the blending weight is a first weight; when the motion index indicates that the current area is a motion area, the weight corresponding to the first image data in the blending weight is a second weight, wherein the first weight is greater than the second weight.

3. The image processing device of claim 1, wherein when the motion index indicates that a number of motion areas in a current frame of the input image data is a first value, a weight corresponding to the first image data in the blending weight is a first weight; when the motion index indicates that the number of motion areas in the current frame is a second value, the weight corresponding to the first image data in the blending weight is a second weight, wherein the first value is smaller than the second value and the first weight is greater than the second weight.

4. The image processing device of claim 1, wherein the 3D NR circuit comprises:
    a temporal filter, performing temporal filtering according to a reference frame and a current frame in the input image data to generate first data;
    a spatial filter, performing spatial filtering according to the reference frame and the current frame to generate second data; and
    a second image blending circuit, blending the first data and the second data according to the motion index to generate the first image data.

5. The image processing device of claim 4, wherein the 3D NR circuit further comprises:
    a motion detector, detecting motion area information of the current frame according to a difference between the current frame and the reference frame to generate the motion index.

6. The image processing device of claim 5, wherein the motion detector comprises:
    a sum of absolute differences (SAD) calculation circuit, calculating sums of absolute differences between a plurality of corresponding blocks in the current frame and the reference frame to generate a plurality of differences;
    a comparison circuit, comparing each of the differences with a threshold value to generate a plurality of detection values; and
    a determination circuit, determining the motion index according to the detection values.

7. The image processing device of claim 1, wherein the AI NR circuit determines the motion index further according to the input image data.

8. The image processing device of claim 7, wherein the AI NR circuit determines the motion index according to a current frame in the input image data and data generated by a temporal filter in the 3D NR circuit.

9. The image processing device of claim 1, wherein the motion detector is generated by an AI circuit.

10. The image processing device of claim 1, wherein the weight determination circuit comprises:
    a memory circuit, storing a look-up table; and
    a look-up table (LUT) circuit, reading the look-up table according to the motion index to output the blending weight.

11. The image processing device of claim 1, wherein the weight determination circuit is implemented by an AI circuit.

12. The image processing device of claim 11, wherein the AI NR circuit performs training based on the input image data and the motion index to generate the blending weight.

13. The image processing device of claim 11, wherein the weight determination circuit further adjusts the blending weight according to an external command.

14. The image processing device of claim 11, wherein the AI circuit is included in the AI NR circuit.

15. The image processing device of claim 1, wherein the AI NR circuit comprises:
    a process control module; and
    a multiply-accumulate array, reading weight data based on control of the process control module, and performing the AI NR operation on the input image data according to the weight data to generate the second image data.

16. An image processing method, comprising:
    performing a 3D NR operation on input image data by a three-dimensional noise reduction (3D NR) circuit to generate first image data;

performing an AI NR operation on the input image data by an artificial intelligence noise reduction (AI NR) circuit to generate second image data;
generating a blending weight according to a motion index; and
blending the first image data and the second image data according to the blending weight to generate output image data.

17. The image processing method of claim 16, wherein when the motion index indicates that a current area in the input image data is a still area, a weight corresponding to the first image data in the blending weight is a first weight; when the motion index indicates that the current area is a motion area, the weight corresponding to the first image data in the blending weight is a second weight, wherein the first weight is greater than the second weight.

18. The image processing method of claim 16, wherein when the motion index indicates that a number of motion areas in a current frame of the input image data is a first value, a weight corresponding to the first image data in the blending weight is a first weight; when the motion index indicates that the number of motion areas in the current frame is a second value, the weight corresponding to the first image data in the blending weight is a second weight, wherein the first value is smaller than the second value and the first weight is greater than the second weight.

19. An image processing device, comprising:
a temporal filter, performing temporal filtering according to a reference frame and a current frame in input image data to generate first data;
a spatial filter, performing spatial filtering according to the reference frame and the current frame to generate second data;
an artificial intelligence noise reduction (AI NR) circuit, performing an AI NR operation on the input image data to generate third data; and
an image blending circuit, blending the first data, the second data and the third data to generate output image data.

* * * * *